Oct. 2, 1962 W. C. KNOEBEL 3,056,607
MULTI-PIECE PISTON RING
Filed Dec. 27, 1960 2 Sheets-Sheet 1

INVENTOR.
WALTER C. KNOEBEL
BY
Sutherland, Pulster & Taylor
ATTORNEYS

Oct. 2, 1962    W. C. KNOEBEL    3,056,607
MULTI-PIECE PISTON RING
Filed Dec. 27, 1960

INVENTOR.
WALTER C. KNOEBEL
BY
Sutherland, Polster & Taylor
ATTORNEYS 3,056,607
MULTI-PIECE PISTON RING
Walter C. Knoebel, St. Louis County, Mo., assignor to McQuay-Norris Manufacturing Company, St. Louis, Mo., a corporation of Delaware
Filed Dec. 27, 1960, Ser. No. 78,549
18 Claims. (Cl. 277—160)

This invention relates to piston rings and more specifically to a full-floating, multi-piece ring of the type termed a compression ring for use on a piston for an internal combustion engine and other analogous purposes. When used on the piston of an internal combustion engine, this type of ring is located usually directly below and is required to cooperate with a fire ring, so as to minimize blow-by past the piston on the compression stroke and on the power stroke of the engine. To be suitable for this purpose, it must maintain both a seal against the cylinder wall and a seal in the groove of the piston in both directions of piston movement. It is believed well understood in the art that most compression rings are forced outwardly against the cylinder wall by the gas pressure behind the ring during the working stroke by penetration of the combustion pressure in the firing chamber to the ring groove behind the ring, and that the sealing force of the ring against the cylinder wall is dependent in a large part on gas pressure. What is not so well understood is that passenger cars operating at road load in a range of speed from 50 to 60 miles per hour require only 10 to 15% of the rated horsepower output of the modern automobile engine. Under these operating conditions, combustion pressures and BMEP is relatively low, while manifold vacuum, on the other hand, is termed very high. Possibly as high as minus 16 inches Hg which means in turn that compression pressures will also be very moderate. Since these operating characteristics of the engine are obtained at cruising speed, their existence may be continuous for relatively long periods of engine operation, and, of course, if this is so, gas pressure behind the lower compression ring, or rings, will be practically non-existent. The ring, therefore, if it seals at all, must depend upon its inherent resiliency to urge the ring into sealing contact with the cylinder wall. This is also true during normal compression braking of the engine, and it is these conditions which spell out a severe test for piston rings and especially for compression rings which depend, as they do, to some extent on pressure behind the ring to obtain the seal with the cylinder wall. On compression braking above mentioned, the high negative pressure in the combustion chamber tends to suck the oil up the cylinder wall from the oil ring past the compression rings and also from all of the ring grooves into the combustion chamber where it is burned or blown out the exhaust the instant a demand for power increases the temperature and pressure in the combustion chamber. In other words, under these mentioned conditions, at least, the rings are operating under unfavorable conditions, and it is therefore, not difficult to understand why in many instances loss of compression, blow-by and high oil consumption could occur. To combat these adverse operating conditions for the rings, spring expanders of different types have been applied behind the compression rings, but without marked success since the spring expander ring more than likely does not improve the seal between the ring and the ring groove in the piston. Recently compression rings have appeared on the market which are multi-piece rings, that is, two thin steel rails with a T-shaped reverse loop type of spring expander between, with the wings of the T acting outwardly at the inner periphery of the rails. While these multi-piece rings may, in some applications, show improved sealing, subsequent experience has shown that oil penetrating into the pockets at the outer periphery between the rails does not drain out of the piston groove, but is trapped therein and subsequently carbonizes to seize the multi-piece ring in the groove. In this respect, the ring, according to the present invention, provides for drainage, and when so constructed, tests seem to substantiate that this invention represents a substantial step forward in the art of compression rings. To a substantial degree, it has overcome the disadvantages heretofore encountered with multi-piece ring arrangements heretofore proposed.

According to this invention, the compression ring is a multi-piece ring including a thin cylinder engaging ring or rail, a filler ring element or rail and a reverse looped spring ring element of S-shaped section therebetween. The hook of the S-shaped ring at its inner periphery engages behind the cylinder engaging ring element, or rail, and the hook of the S-shaped ring at its outer periphery engages the outer periphery of the filler ring element, or rail. Whereas the rails are preferably plain, flat rings, the spring expander ring element is preferably a dished ring in section, so that when compressed circumferentially, it will lie flat radially so that contact between the multi-piece ring elements is an intimate one to distribute wear evenly and produce the desired seal between the ring elements and the ring elements and the groove. The outer hook of the S-shaped spring ring does not contact the cylinder wall, which means that an oil sump is formed beneath the outer edge of the cylinder engaging ring element to trap the oil sucked upwardly from the piston wall on the down stroke of the piston, which oil will be discharged on the up stroke from the sump. Oil may penetrate into and drain out of the ring groove and also drain out of the multiple loops of the reverse looped spring expander during ring flexing. Oil is not permanently trapped between the convolutions of the reverse loop spring expander as heretofore. The oil accumulating in the sump beneath the outer periphery of the cylinder engaging ring element may freely return to the oil ring and drain to the crank case, and for this reason, the ring might be termed a combined compression and oil control ring.

It is an object of this invention to provide a compression ring which is as effective to seal off small pressure differentials as it is large pressure differentials. It being understood that by small pressure differentials, applicant means differences in pressure existing on opposite sides of the piston head during engine braking and at light engine loads, and by large pressure differentials, applicant means pressure differentials existing on opposite sides of the piston during full load compression and subsequent maximum (BMEP) with peak combustion pressure acting on the piston.

It is still another object of this invention to provide a compression ring which is effective to seal off small pressure differentials and operate effectively in this respect at relatively high piston speeds.

It is still another object of this invention to provide a compression ring which is effective to control oil passage along the piston from bottom to top thereof.

It is still another object of this invention to provide a compression ring of the multi-piece kind which will seal in the groove and against the cylinder wall surface under light loads and during compression braking of an engine.

It is still another object of this invention to provide a compression ring of the multi-piece type providing for lubrication and drainage.

Other objects and advantages of this invention will become apparent from the following detailed description which is in such full, clear, concise and exact terms as to enable any one skilled in the art to make and use the same when taken with the illustrations in the accompanying drawings, forming a part thereof, and in which.

Figure 1:
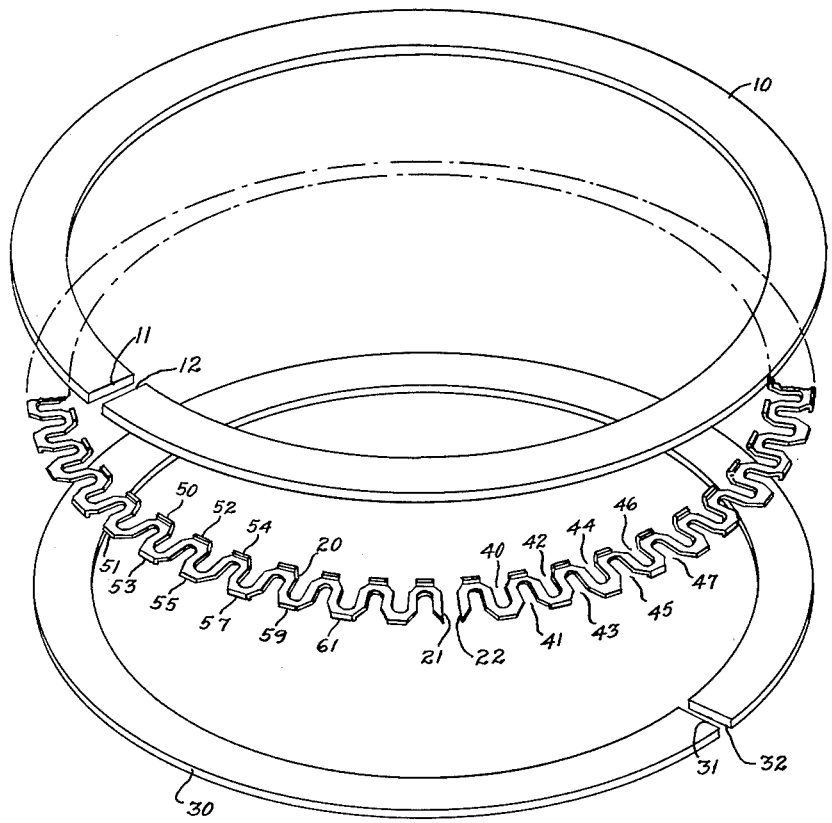
FIG. 1 is an exploded view in perspective of the ring elements forming the multi-piece ring.

With reference to the drawings, it will be apparent as in FIG. 1 that the piston ring assembly in its preferred form has three pieces or elements, whether they are made independently as disclosed here or not may be a matter wholly of engineering design. In this preferred form, the assembly comprises a plain split ring or rail 10 which is of a diameter to engage the cylinder wall and at the same time radially dimensioned of a width to be received in the groove of a piston. Below the ring element 10 is a spring ring expander element of S-shaped section 20 which is dimensioned so as to have a substantial clearance with the cylinder wall and wide enough to be received in the ring groove of the piston ring. The lower ring 30 is a plain, split ring element or rail termed here for convenience a filler-ring. This ring is dimensioned so as to be substantially wholly received within the groove and the piston. Split ring 10 has spaced ends 11 and 12 which permit expansion and contraction of the ring 10 during operation in the cylinder. Ring 20 has adjacent ends 21 and 22 which come into abutting relation when the ring 20 is compressed circumferentially during operation in the cylinder. The ring 30 is a plain rail, or split ring, with adjacent ends 31 and 32 which will permit expansion and contraction of the ring 30 during operation in the cylinder. The rings 10 and 30 are preferably thin steel rails, while the ring 20 is a spring expander ring, the construction of which will be described hereinafter in detail as well as its operation together with the rails 10 and 30.

Figure 2:
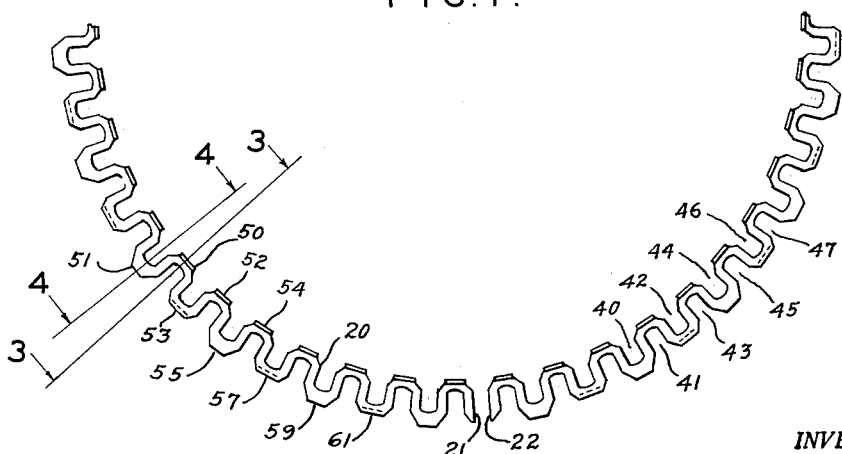
FIG. 2 is a top plan view of the spring expander ring element.
Figure 3:
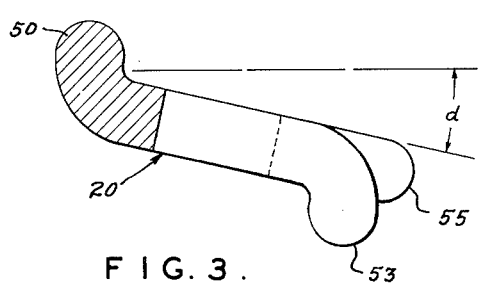
FIG. 3 is a sectional view taken on the line 3—3 of FIG. 2 looking in the direction of the arrows.
Figure 4:
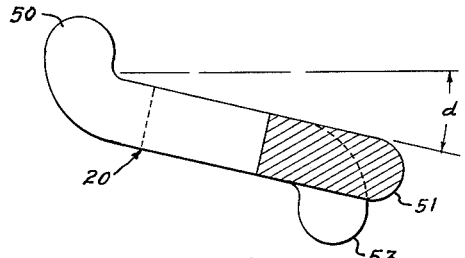
FIG. 4 is a sectional view taken on the line 4—4 of FIG. 2 looking in the direction of the arrows.

The specific construction of the spring ring 20 is more clearly illustrated in FIGS. 2, 3 and 4. With reference to these figures, ring 20 is constructed of a flat strip of spring steel or other metal notched alternately from opposite sides to form a flat spring. The notches on the outer periphery of the ring 20 are indicated by the odd reference characters 41, 43, etc. The notches at the inner periphery of the ring 20 are indicated by the even reference characters 40, 42, etc. It will be noted that both sets of notches are relatively evenly spaced, and that they define between them inner and outer directed loops of metal of U-shape and that these U-shaped loops which are inwardly and outwardly directed are connected to form a flat spring with reversely directed loops which are continuous from one end 21 to the opposite end 22. At the inner periphery of the ring 20, the bight portion of each U-shaped loop is deformed upwardly to form a tang as illustrated in FIG. 2 by the reference characters 50, 52, 54, etc. At the outer periphery of the ring 20, preferably at least every other one of the bight portions of the U-shaped loops, such as 53, 57, 61, etc., are turned downwardly to form downwardly projecting tangs. The intermediate U-shaped bights, such as 51, 55, 59, etc., constitute projecting loops on the strip forming the ring 20 and function to increase the bearing surface between the rings.

Turning now to FIG. 3, the sectional view therein represented illustrates the section of the ring 20 taken on the line 3—3 showing the upwardly extending tang 50, the downwardly extending projecting tang 53 and the loop portion 55 projecting beyond the tang 53. The section in FIG. 4 on the line 4—4 looking in the same direction would show an upwardly projecting tang 50, a downwardly projecting tang 53 and the projecting loop 51. Oppositely directed tangs 50—53, 54—57, etc., form a plurality of sections around the periphery of the ring which are, or may be, termed S-shaped sections. Of course, if each of the loops 51, 55 and 59 were also deformed like the loops 53, 57, 61, then every section through the ring would be a S-shaped section. However, as will be hereinafter pointed out, it is not necessary that every section of the ring be S-shaped, or, put another way, it is not necessary for each of the loops at the outer periphery of the ring to be bent downwardly to form a tang, but it can be so constructed, if desired. In the preferred embodiment, alternate outer loops have tangs, so that alternate loops are S-shaped and hook-shaped.

As clearly shown in both FIGS. 3 and 4, the strip for the ring 20 is dished through an angle indicated as $d$ from a flat shape. In other words, in the free state the ring 20 is a dished ring. The angle $d$ depends primarily upon many variables of ring design. Thus, taking as an example a spring ring for a 3¾ inch diameter piston, if the ring is in the neighborhood of about ⅛ inch wide, the angle $d$ could be in the range of 15 degrees.

Figure 5:
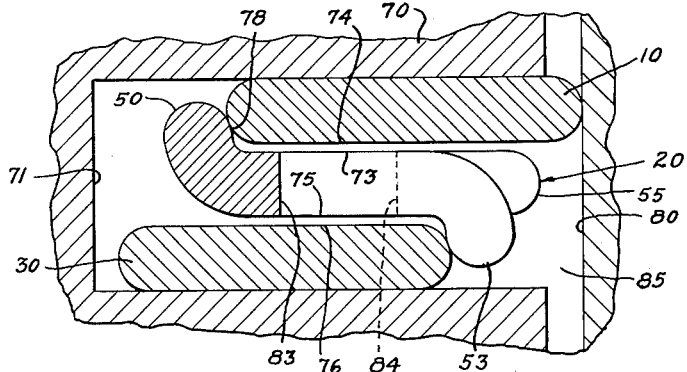
FIG. 5 is a fragmentary sectional view on a much enlarged scale showing a portion of the piston adjacent the piston groove, a portion of the cylinder wall opposite the piston groove and the piston ring assembly in the groove.

FIG. 5 illustrates in section the ring when assembled with the piston 70. This is a sectional view of all the ring elements and corresponds with the section along line 3—3 and FIG. 3. When assembled, the tangs 50, 52, 54, etc., engage along the inner periphery of the ring 10 at spaced intervals. On the other hand, the tangs 53, 57, 61, etc., engage around the outer periphery of the filler-ring 40. When the ring assembly including the rings 10, 20 and 30 are compressed into the groove 71 of the piston by the action of the cylinder wall 80, ring 20 is compressed circumferentially by the force of the ring 10 acting on the tangs at the inner periphery of the ring 20. Consequently, the tangs at the inner periphery of the ring 20 continually urge the cylinder engaging element 10 into contact with the cylinder wall 80. When installed in the piston ring groove, the dished ring 20 is flattened because the width of the groove limits the spacing of the ring elements. Actually, however, it is the compressive force of the cylinder wall on ring 10 which compresses and flattens spring ring 20 so that its upper surface 73 bears along the radial face of the under surface 74 of the cylinder wall ring engaging element 10. This gives a wide bearing area between the upper surface of the ring 20 and the lower surface of the ring 10, likewise when the ring 20 is flattened, its lower surface 75 will extend along the radial face of the upper suface 76 of the filler-ring 30 so as to give a good bearing area between these surfaces to distribute the load and even up the wear therebetween. Of course, the ring 20 has a tendency to resume its dished condition, but this tendency is resisted by the fact that the compressing force of the ring 10 exerted at the point 78 forms a twisting couple tending to maintain the ring 20 flat. Therefore, the ring 10 is forced outwardly against the cylinder wall in the first place by the tendency of the spring ring 20 to expand circumferentially, and in the second place, by the tendency of the spring ring 20 to return to its initial dished state. The filler-ring 30 like the ring 10 is a rail element, which is split, and is, therefore, capable of expansion and contraction. Since this is true also during the operation of the ring assembly in the piston, the filler ring 30 will move with the spring ring 20 as it expands and contracts radially. The lines 83 and 84 in FIG. 5 indicate the extent or depth to which opposite notches in the ring 20 extend, and this indicates that there is no free gas passage left between the two rail elements 10 and 30 and the spring ring 20.

Figure 6:
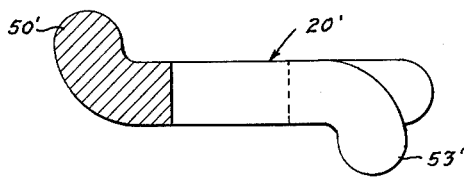
FIG. 6 is a sectional view similar to FIG. 3, but illustrating a ring which is flat in the free state rather than dished.
Figure 7:
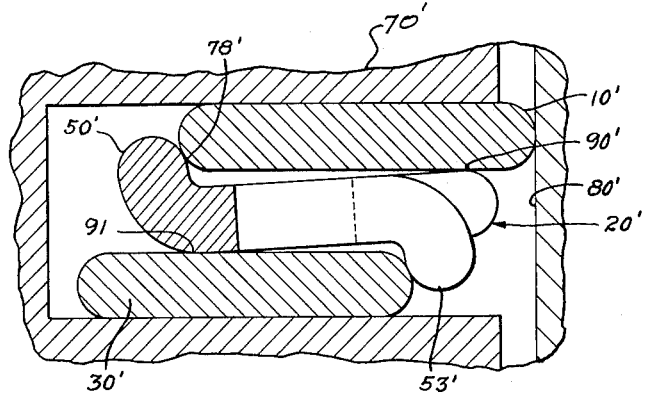
FIG. 7 is a view similar to FIG. 5 which illustrates the co-action of the parts of the assembly with a spring ring which is flat in the free state.

FIG. 6 illustrates the same ring 20 illustrated here as 20' constructed to be flat in the free state. FIG. 7 illustrates in an exaggerated fashion what can happen when a ring, such as shown in FIG. 6, is installed on the piston 70'. As this figure illustrates, no continuous bearing surface is obtained between the ring elements. In fact, the contact between the rings 10' and 20' amounts to a two point support at the inner and outer edge, one at 78' where the force is applied outwardly from expander 20' to ring element 10', and point 90' at the outer edge of the ring 20'. Similarly the contact point 91 forms the bearing surface between the expander ring 20' and the upper surface of the filler-ring 30'. The expander ring 20' also has a tendency to buckle along its length circumferentially so that its force distribution is decidedly non-uniform. The wearing points will, therefore, shorten the life of the ring assembly as these figures indicate.

Operation

Referring to FIG. 5, the piston ring assembly, according to this invention, will have good surface bearing areas between the rings thereby minimizing wear. The compression ring element 10, which bears against the cylinder wall, will be continuously urged outwardly against the cylinder wall to form the seal therewith and upwardly against the upper surface of the piston ring groove to form a corresponding seal with the piston. The spring force will be sufficient to give good compression sealing with both cylinder and piston at small differential pressures above and below the piston, and the action of the ring will not be adversely affected by high manifold vacuum in the engine and combustion chamber. The latter will be true since there is an oil sump 85 formed to trap the oil below the cylinder engaging element 10 on the downward stroke of the piston and there is nothing to impede its flow into the space below the groove and between the piston and the cylinder wall on the upward stroke of the piston. Since the expander ring 20 is a dished ring in its free state, there will be a compound action of this ring in response to the action of the cylinder wall on the outer periphery of the wall engaging ring element 10 which will cause the assembly to breathe during engine operation and the oil to be continually pumped out from between the rings as it accumulates. This ensures a continual circulation, thus delaying the effect of ring seizure in the groove due to carbonation of the oil. In the modification above described, the ring 20 is preferably formed from a flat strip of sheet metal, but it is obvious that similar results could be obtained by forming the ring 20 of corrugated wire. Regardless of the spring metal used in the ring, it will be effective as a seal from minimum to maximum differential pressures. Under the latter condition, gas pressures behind the ring assembly act on the inner periphery of rings 10, 20, and 30 to force the ring 10 into sealing contact with the cylinder wall. Under these conditions, of course, the gas pressure tending to expand ring 30 is transferred through ring 20 to the ring element 10.

Changes in and modifications of the construction described may be made without departing from the spirit of my invention or sacrificing its advantages.

Having thus described the invention, what is claimed and desired to be secured by Letters Patent is:

1. A multi-piece piston ring assembly adapted to be received in a piston ring groove comprising an expansible and contractible compression ring element adapted to engage a cylinder wall at its outer periphery, a filler-ring element located beside said compression ring element so that said elements lie entirely one above the other in said piston ring groove, and a circumferentially expansible and contractible spring expander ring element located beside said first-named elements and having means engaging adjacent the inner periphery of said compression ring element for forcing said ring to engage a cylinder wall and means engaging adjacent the outer periphery of said filler-ring for yieldingly retaining said filler-ring in said groove.

2. A multi-piece piston ring assembly adapted to be received in a piston ring groove comprising an expansible and contractible compression ring element adapted to engage a cylinder wall at its outer periphery, a filler-ring element located beside said compression ring element, and a circumferentially expansible and contractible spring ring element of dished shape in its free state located between said first mentioned elements and having means engaging adjacent the inner periphery of said compression ring element for forcing said ring to engage a cylinder wall and means engaging adjacent the outer periphery of said filler-ring for yieldingly retaining said filler-ring in the piston ring groove.

3. A multi-piece piston ring assembly adapted to be received in a piston ring groove comprising an expansible and contractible compression ring element adapted to engage a cylinder wall at its outer periphery, a filler-ring element located beside said compression ring element, and an expander ring of substantially S-shaped section between said first mentioned elements with its oppositely hooked ends engaging the inner and outer peripheries thereof respectively.

4. A multi-piece piston ring assembly adapted to be received in a piston ring groove comprising an expansible and contractible compression ring element adapted to engage a cylinder wall at its outer periphery, a filler-ring element located beside said compression ring element, and an expander ring of dished shape in its free state and of substantially S-shaped section between said elements with its oppositely hooked ends engaging the inner and outer peripheries thereof respectively.

5. An expander spring ring element for a multi-piece piston ring assembly comprising an annular ring element formed of a plurality of adjacent interconnected resilient loops facing in opposite directions with portions at the inner and outer periphery of the ring bent into oppositely extending tangs so that sections of said ring are substantially S-shaped.

6. An expander ring element for a multi-piece piston ring assembly comprising an annular ring element of dished shape in its free state formed of a plurality of adjacent interconnected resilient loops facing in opposite directions with portions at the inner and outer periphery of the ring bent into oppositely extending tangs so that sections of said ring are substantially S-shaped.

7. A piston ring assembly adapted to be received in a piston ring groove comprising an expansible and contractible lower ring element adapted to be received within the groove, an intermediate expansible and contractible spring expander ring element seated on one side of said first mentioned element, an upper expansible and contractible ring element seated on the other face of said spring expander ring, and means for restraining expansion of said lower ring element and for resisting contraction of said upper ring element with respect to said intermediate ring element.

8. A piston ring assembly adapted to be received in a piston ring groove comprising an expansible and contractible lower ring element adapted to be received within the groove, an intermediate expansible and contractible spring ring element of dished shape in its free state seated on one side of said first mentioned element, an upper expansible and contractible ring element seated on the other face of said intermediate element and means for restraining expansion of said lower ring element and for resisting contraction of said upper ring element with respect to said intermediate ring element.

9. A piston ring assembly adapted to be received in a piston ring groove comprising an expansible and contractible lower ring element adapted to be received within the groove, intermediate expansible and contractible spring expander ring element of larger outside diameter than said lower ring element seated on one side thereof, an upper expansible and contractible ring element of larger outside diameter than said intermediate ring element seated on the other face thereof and adapted to seat against the upper surface of the groove and means for restraining expansion of said lower ring element and for resisting contraction of said upper ring element with respect to said intermediate spring expander ring element.

10. A piston ring assembly adapted to be received in a piston ring groove comprising an expansible and contractible lower ring element adapted to be received within the groove, an intermediate expansible and contractible spring ring element of dished shape in its free state and of larger outside diameter than said lower ring element and seated on the upper side thereof, an upper expansible and contractible top ring element of larger outside diameter than said intermediate ring element seated on the upper face thereof and adapted to seat against the upper face of the ring groove and means for restraining expansion of said lower ring element and for resisting contraction of said upper ring element with respect to said intermediate ring element.

11. A piston ring assembly for use in the piston ring groove of a piston operating in the cylinder of an internal combustion engine, said piston ring assembly comprising an expansible and contractible lower ring element adapted to seat on one side face of the piston ring groove and spaced from the bottom wall thereof, an intermediate expansible and contractible spring expander ring element of larger outside diameter than said lower ring seated on the upper side thereof, an upper expansible and contractible top ring element of larger outside diameter than said intermediate ring element seated on the upper face thereof with its outer periphery in contact with a cylinder wall and the top of the ring groove, means for restraining expansion of said lower ring element and for resisting contraction of said upper ring element with respect to said intermediate ring element, and a gas space formed at the inner periphery of all of said elements so that gas pressure at the inner periphery of said elements forces said top element outwardly against the piston wall.

12. A piston ring assembly for use in the ring groove of a piston operating in a cylinder, said piston ring assembly comprising an expansible and contractible lower ring element adapted to seat on one side face of the groove, an intermediate expansible and contractible spring ring element of larger outside diameter than said lower ring element seated on the upper side thereof, an upper expansible and contractible top ring element of larger outside diameter than said intermediate ring element seated on the upper face thereof and adapted to seat against the other side wall of the piston groove and means for restraining expansion of said lower ring element and for resisting contraction of said upper ring element with respect to said intermediate ring element to form an oil sump below said top ring element and adjacent the outer periphery of said other ring elements.

13. A piston ring assembly adapted to be received in a piston ring groove comprising an expansible and contractible ring element adapted to be received within the groove, an intermediate annular expander spring ring element formed of a plurality of adjacent interconnected resilient loops facing in opposite directions seated on one face of said first ring element, an upper expansible and contractible ring element seated on the other face of said intermediate ring element, and portions at the inner and outer periphery of said intermediate ring element forming oppositely extending tangs for restraining expansion of said lower ring element and for resisting contraction of said upper ring element with respect to said intermediate ring element.

14. A piston ring assembly adapted to be received in a piston ring groove comprising an expansible and contractible ring element adapted to be received within the groove, an intermediate annular expander spring ring element of dished shape in its free state formed of a plurality of adjacent interconnected resilient loops facing in opposite directions seated on one side of said first ring element, an upper expansible and contractible top ring element seated on the other face of said intermediate spring element and adapted to seat against the upper wall of the piston ring groove, and portions at the inner and outer periphery of the ring bent into oppositely extending tangs for engaging the peripheries of said ring elements to restrain expansion of said lower ring element and to resist contraction of said upper ring element with respect to said intermediate ring element.

15. A piston ring assembly adapted to be received in a piston ring groove comprising an expansible and contractible ring element adapted to seat on one face of the groove, an intermediate annular expander spring ring element of dished shape in its free state larger in outside diameter than said lower ring element and formed of a plurality of adjacent interconnected resilient loops facing in opposite directions and seated on the upper side of said first ring element, an upper expansible and contractible top ring element of larger outside diameter than said intermediate ring element seated on the upper face thereof and adapted to seat against the upper face of the piston ring groove and portions at the inner and outer periphery of said intermediate ring element bent into oppositely extending tangs for engaging the outer and inner peripheries of said ring elements, respectively, restraining expansion of said lower ring element and resisting contraction of said upper ring element with respect to said intermediate ring element.

16. A multi-piece piston ring assembly adapted to be received in a piston ring groove comprising an expansible and contractible compression ring element adapted to engage a cylinder wall at its outer periphery, a filler-ring element located beside said compression ring element, and a circumferentially expansible and contractible spring expander ring element located between said first-named elements and having means engaginng adjacent the inner periphery of said compression ring element for forcing said ring to engage a cylinder wall, means engaging adjacent the outer periphery of said filler-ring for yieldingly retaining said filler-ring in said groove, and a bearing surface projecting beyond the outer periphery of said filler-ring for supporting said compression ring element.

17. An expander spring ring element for a multipiece piston ring assembly comprising an annular ring element formed of a plurality of adjacent interconnected resilient loops facing in opposite directions with portions at the inner and outer periphery of the ring bent into oppositely extending tangs so that sections of said ring are substantially S-shaped and other portions at the outer periphery of the ring projecting radially outward of said bent portions so that sections of said ring are substantially hook-shaped.

18. A piston ring assembly adapted to be received in a piston ring groove comprising an expansible and contractible ring element adapted to seat on one face of the groove, an intermediate annular expander spring ring element of dished shape in its free stage larger in outside diameter than said lower ring element and formed of a plurality of adjacent interconnected resilient loops facing in opposite directions and seated on the upper side of said first ring element, an upper expansible and contractible top ring element of larger outside diameter than said intermediate ring element seated on the upper face thereof and adapted to seat against the upper face of the piston ring groove and portions at the inner periphery and some of the portions at the outer periphery of said intermediate ring element bent into oppositely extending tangs for engaging the outer and inner peripheries of said ring elements, respectively, resisting contraction of said upper ring element and restraining expansion of said lower ring element with respect to said intermediate ring element, and other portions at the outer periphery of said intermediate ring element projecting outwardly of said tangs to support said top ring element.

References Cited in the file of this patent

UNITED STATES PATENTS

| | | |
|---|---|---|
| 2,587,888 | Phillips | May 4, 1952 |
| 2,642,324 | Teetor | June 16, 1953 |
| 2,670,256 | Hsia-si Pien | Feb. 23, 1954 |

FOREIGN PATENTS

| | | |
|---|---|---|
| 841,856 | France | Mar. 31, 1939 |
| 566,787 | Great Britain | Jan. 15, 1945 |